(12) United States Patent
Gutmark et al.

(10) Patent No.: US 7,246,481 B2
(45) Date of Patent: Jul. 24, 2007

(54) METHODS AND APPARATUS FOR OPERATING GAS TURBINE ENGINES

(75) Inventors: Ephraim Jeff Gutmark, Cincinnati, OH (US); Steven Martens, West Chester, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 10/810,142

(22) Filed: Mar. 26, 2004

(65) Prior Publication Data

US 2005/0214107 A1    Sep. 29, 2005

(51) Int. Cl.
F02K 1/34 (2006.01)
F02K 1/40 (2006.01)

(52) U.S. Cl. .............. 60/204; 60/262; 60/264; 181/213; 181/220; 239/265.17

(58) Field of Classification Search ............. 60/262, 60/264, 204; 181/213, 220; 239/265.17, 239/265.19
See application file for complete search history.

(56) References Cited

U.S. PATENT DOCUMENTS

| 2,990,905 A | * | 7/1961 | Lilley | 181/220 |
|---|---|---|---|---|
| 3,495,682 A | | 2/1970 | Treiber | |
| 3,527,317 A | * | 9/1970 | Motsinger | 60/226.1 |
| 3,630,311 A | | 12/1971 | Nagamatsu et al. | |
| 3,708,036 A | | 1/1973 | Duthion et al. | |
| 3,954,224 A | | 5/1976 | Colebrook et al. | |
| 3,964,569 A | | 6/1976 | Neumann | |
| 4,064,961 A | | 12/1977 | Tseo | |
| 4,135,363 A | | 1/1979 | Packman | |
| 4,244,440 A | | 1/1981 | Matta et al. | |
| 4,280,587 A | * | 7/1981 | Bhat | 60/262 |
| 4,446,696 A | | 5/1984 | Sargisson et al. | |
| 5,092,425 A | * | 3/1992 | Shaw, Jr. | 181/213 |
| 5,291,672 A | | 3/1994 | Brown | |
| 6,502,383 B1 | | 1/2003 | Janardan et al. | |
| 6,532,729 B2 | * | 3/2003 | Martens | 60/204 |
| 6,718,752 B2 | * | 4/2004 | Nesbitt et al. | 60/262 |
| 6,826,901 B2 | * | 12/2004 | Hebert | 60/264 |

* cited by examiner

*Primary Examiner*—Ted Kim
(74) *Attorney, Agent, or Firm*—William Scott Andes; Armstrong Teasdale LLP

(57) ABSTRACT

A method for operating a gas turbine engine includes channeling compressed air from the gas turbine engine to a noise suppression system, and selectively operating the noise suppression system such that air discharged from the noise suppression system generates a streamwise vortex downstream from each respective chevron.

20 Claims, 6 Drawing Sheets

METHODS AND APPARATUS FOR OPERATING GAS TURBINE ENGINES

BACKGROUND OF THE INVENTION

This invention relates generally to gas turbine engines, and more particularly to methods and apparatus for operating gas turbine engines.

At least some known gas turbine engines include a core engine having, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor.

Combustion gases are discharged from the core engine through an exhaust assembly. More specifically, within at least some known turbofan engines, a core exhaust nozzle discharges core exhaust gases radially inwardly from a concentric fan exhaust nozzle which exhausts fan discharge air therefrom for producing thrust. Generally during engine operation, both exhaust flows approach their maximum velocity during high power engine operations, such as during take-off operations. During such operations, as the high velocity flows interact with each other and with ambient air flowing past the engine, substantial noise may be produced along the take-off path of the aircraft.

To facilitate reducing such noise, at least some known turbine engine exhaust assemblies utilize noise suppression equipment which includes at least one of tabs, mixing lobes, and/or a plurality of chevrons to enhance mixing the core and bypass exhaust flows. Although the tabs, mixing lobes, and chevrons facilitate suppressing noise during high power engine operating conditions, because the tabs, mixing lobes, and chevrons are mechanical devices which remain positioned in the flow path during all flight conditions, such devices may adversely impact engine performance during non-take-off operating conditions. Specifically, during cruise conditions, the tabs, the mixing lobes, and/or the chevrons may adversely impact specific fuel consumption (SFC) of the engine.

BRIEF DESCRIPTION OF THE INVENTION

In one aspect, a method for operating a gas turbine engine is provided. The method includes channeling compressed air from the gas turbine engine to a noise suppression system, and selectively operating the noise suppression system such that air discharged from the noise suppression system generates a streamwise vortex downstream from each respective chevron.

In another aspect, an assembly for a gas turbine engine is provided. The assembly includes a gas turbine nozzle, a plurality of chevrons coupled to the gas turbine nozzle, and a noise suppression system coupled to the gas turbine nozzle, wherein the noise suppression system is selectively operable to facilitate generating a streamwise vortex downstream from each respective chevron.

In a further aspect, a gas turbine engine is provided. The gas turbine engine includes a core engine nozzle, a fan nozzle, a plurality of chevrons coupled to at least one of the core engine nozzle and the fan nozzle, and a noise suppression system coupled to at least one of the core engine nozzle and the fan nozzle, wherein the noise suppression system is selectively operable to facilitate generating a streamwise vortex downstream from each respective chevron.

DETAILED DESCRIPTION OF THE INVENTION

Figure 1:
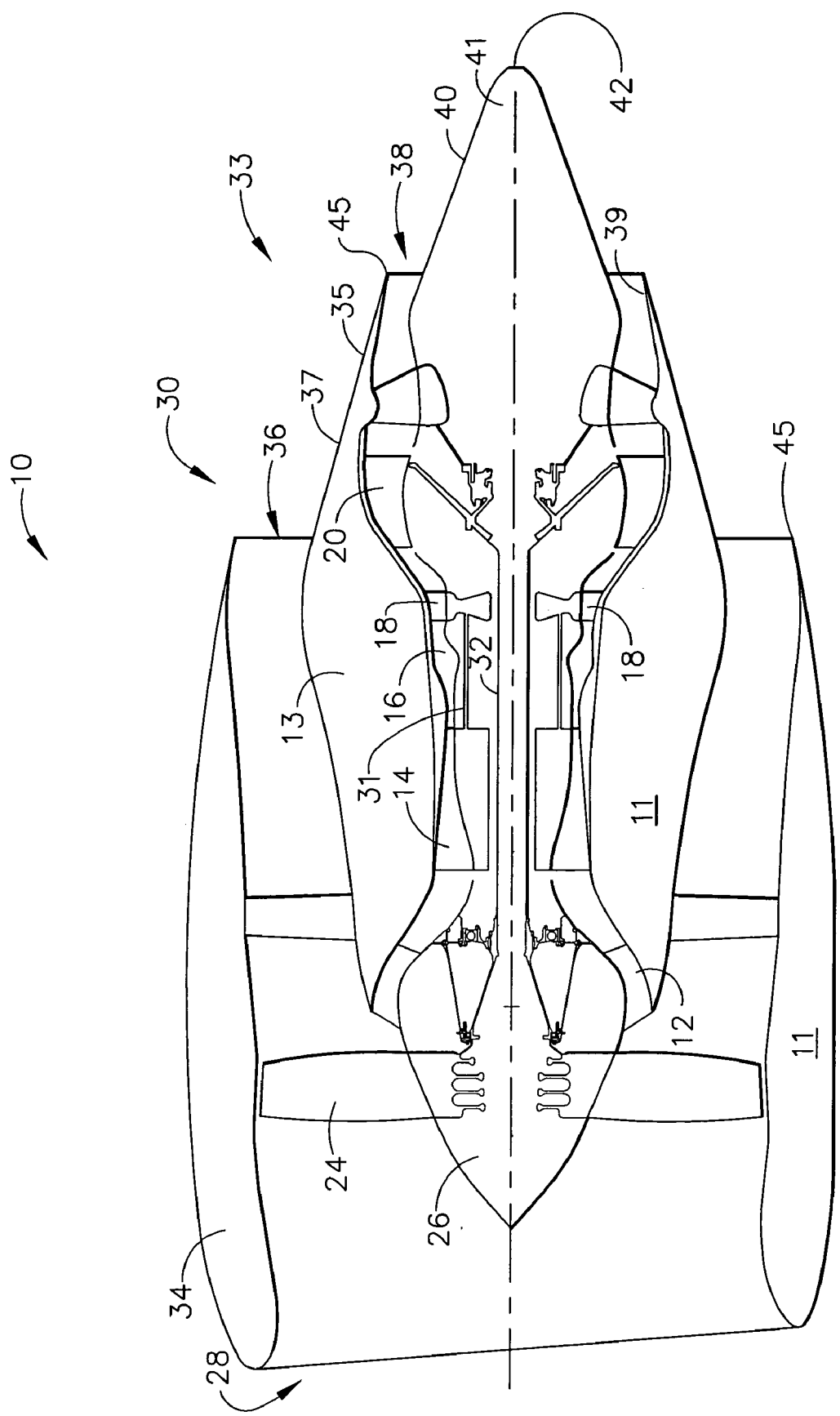
FIG. 1 is a schematic illustration of an exemplary gas turbine engine.
Figure 2:
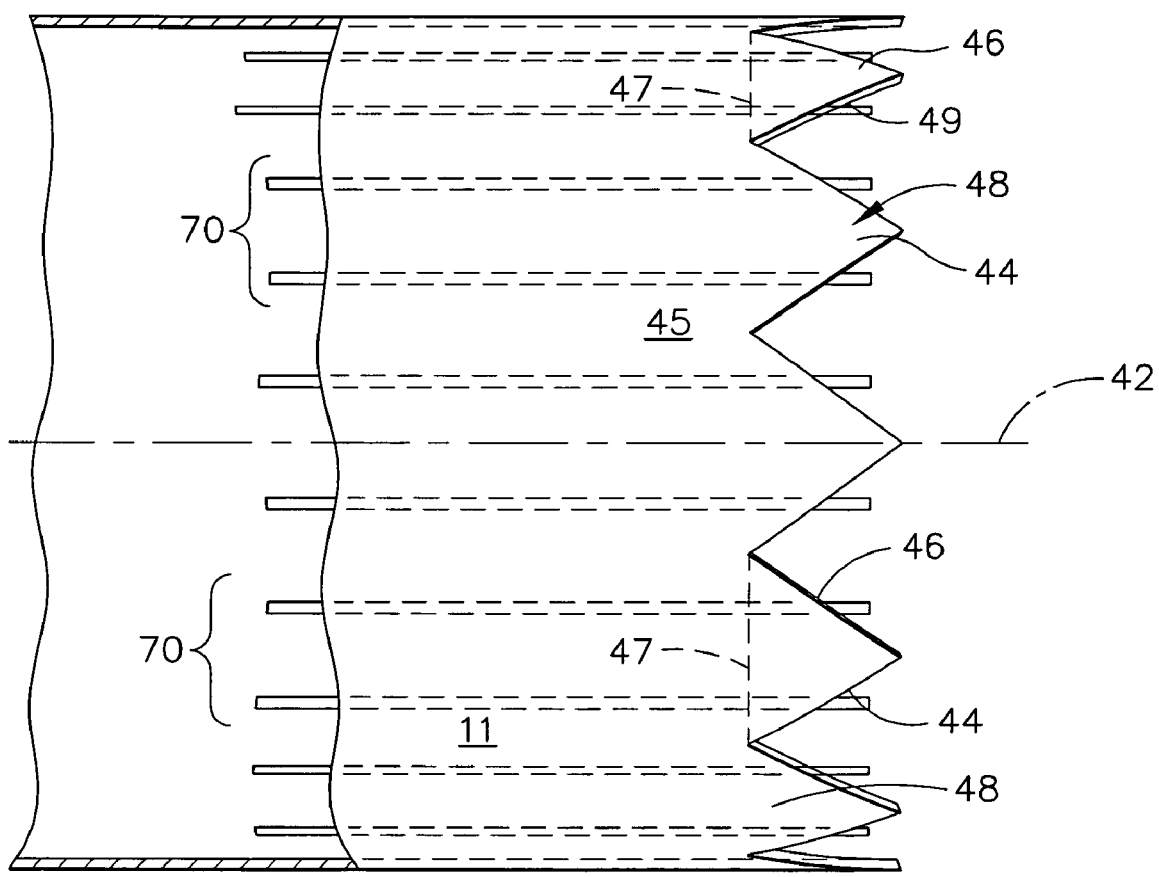
FIG. 2 is a side view of an exemplary chevron nozzle design that may be used with the gas turbine engine shown in FIG. 1.

FIG. 1 is a schematic illustration of a gas turbine engine 10 including a fan assembly 12 and a core engine 13 including a high pressure compressor 14, and a combustor 16. FIG. 2 is a side view of an exemplary nozzle design 11 that may be used with gas turbine engine 10. Engine 10 also includes a high pressure turbine 18, and a low pressure turbine 20. Fan assembly 12 includes an array, of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

An exhaust assembly 33 extends downstream from core engine 13 and includes an annular fan exhaust nozzle 34 that extends around, and is spaced radially outwardly from, a core engine exhaust nozzle 35. More specifically, fan exhaust nozzle 34 is positioned upstream from core exhaust nozzle 35 and is spaced radially outwardly from core engine exhaust nozzle 35 such that an annular bypass stream outlet 36 is defined between fan exhaust nozzle 34 and an engine cowling 37 extending circumferentially around core engine 13.

Core engine exhaust nozzle 35 also includes an annular outlet 38 defined between an inner surface 39 of cowling 37 and an outer surface 40 of a centerbody or center plug 41. In an alternative embodiment, core engine exhaust nozzle 35 is known as a long-ducted mixed flow exhaust and is discharged into stream outlet 36 upstream from centerbody 41, such that core combustion gases are mixed with bypass stream flow prior to the mixture being discharged from exhaust assembly 33. In the exemplary embodiment, centerbody 41 extends aftward from core engine 13 such that core exhaust nozzle outlet 38 is upstream from an aft end 42 of centerbody 41. In an alternative embodiment, centerbody 41 does not extend downstream from nozzle outlet 38, and rather nozzle outlet 38 is downstream from centerbody 41.

In the exemplary embodiment, nozzle design 11 includes at least one of fan nozzle exhaust 34 or core engine exhaust nozzle 35. Nozzle design 11 includes a plurality of circumferentially adjoining chevrons 44 that are positioned at an aft end 45 of either fan exhaust nozzle 34 and/or core engine exhaust nozzle 35. Each chevron 44 has a geometric shape that facilitates noise suppression, as described herein. In the exemplary embodiment, each chevron 44 has a substantially triangular shape and includes a base 47 that is fixedly coupled or integrally joined to either fan nozzle exhaust 34 or core engine exhaust nozzle 35. Each chevron 44 also includes a radially outer surface 48, and a radially opposite inner surface 49.

During operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31. More specifically, to produce thrust from engine 10, fan discharge flow is discharged through fan exhaust nozzle 34, and core combustion gases are discharged from engine 10 through core engine exhaust nozzle 35. In one embodiment, engine 10 is operated at a relatively high bypass ratio which is indicative of the amount of fan air which bypasses core engine 13 and is discharged through fan exhaust nozzle 34. In an alternative embodiment, gas turbine engine 10 is operable with a low bypass ratio.

Figure 3:
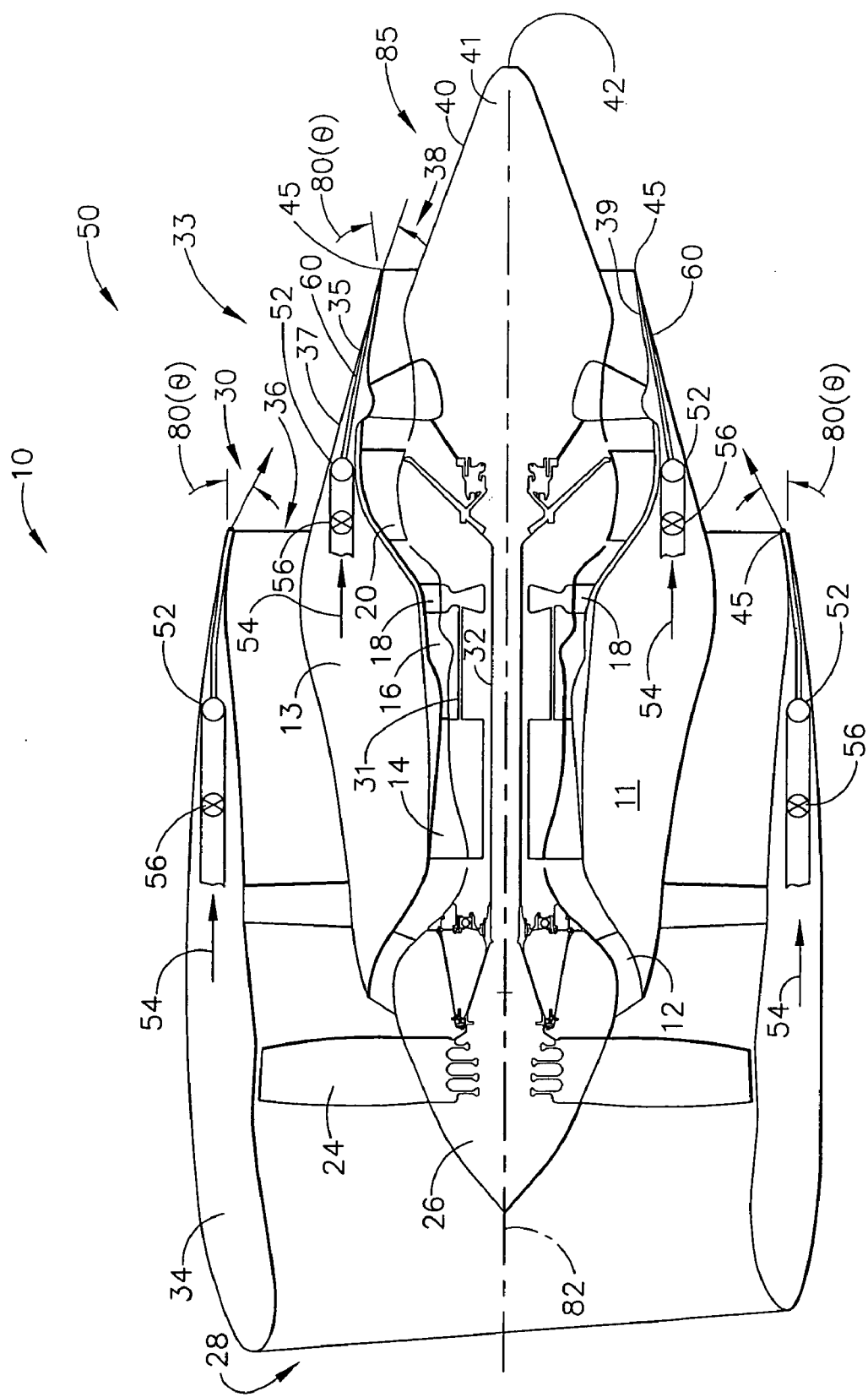
FIG. 3 is a side view of an exemplary noise suppression system that may be used with the gas turbine engine shown in FIG. 1.
Figure 4:
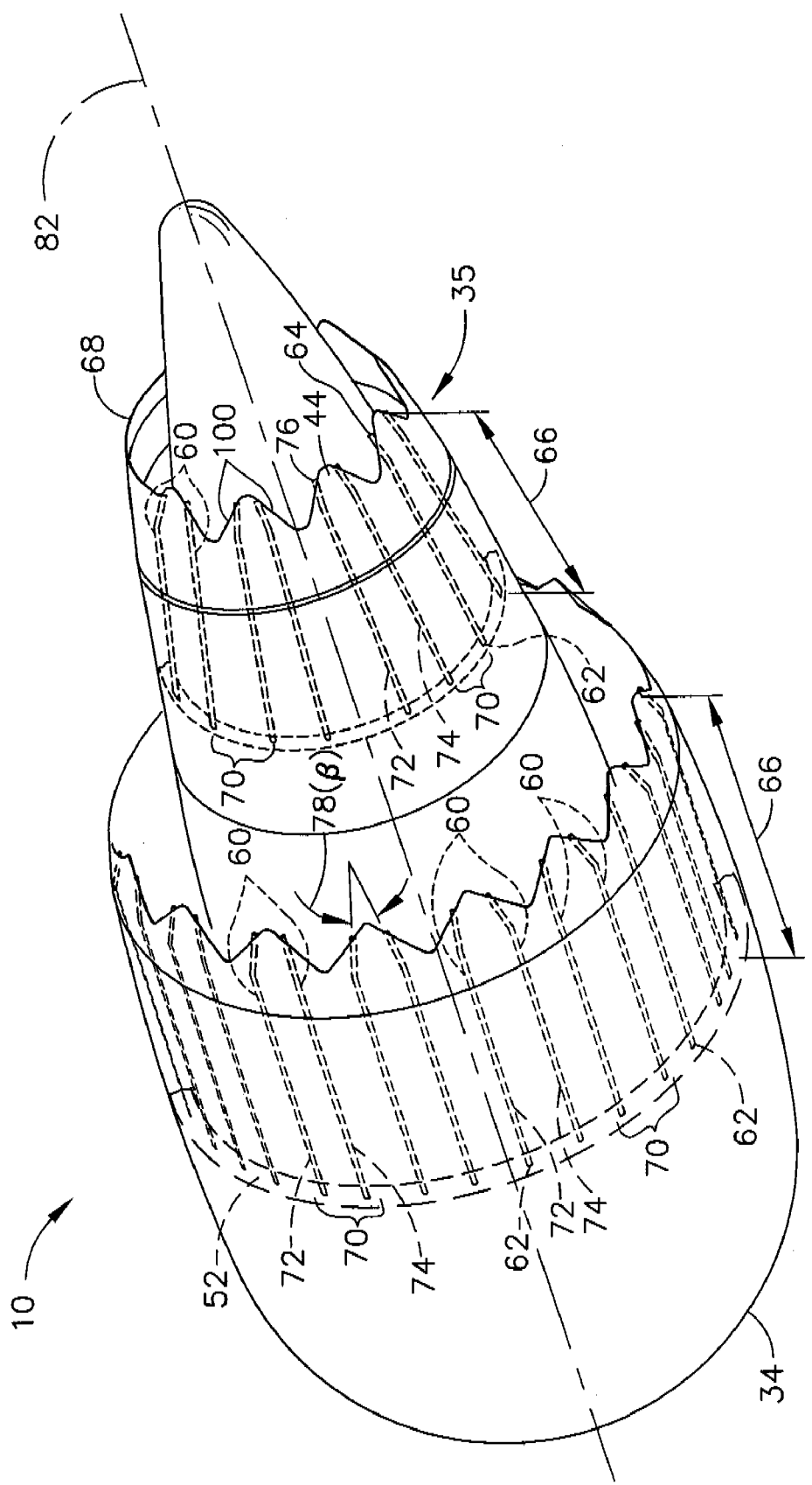
FIG. 4 is a perspective view of the noise suppression system shown in FIG. 3.

FIG. 3 is a side view of an exemplary noise suppression system 50 that can be used with gas turbine engine 10. FIG. 4 is a perspective view of noise suppression system 50. In an exemplary embodiment, noise suppression system 50 is operably coupled to core engine exhaust nozzle 35. Noise suppression system 50 includes a manifold 52 coupled to core engine exhaust nozzle 35 such that manifold 52 circumscribes core engine exhaust nozzle 35. Compressed air is discharged from an air source 54 through an actuation valve 56 into manifold 52. In the exemplary embodiment, air is supplied to manifold 52 from at least one of fan assembly 12, high pressure compressor 14, high pressure turbine 18, or low pressure turbine 20.

Noise suppression system 50 also includes a plurality of tubes 60 coupled to manifold 52 and operated such that air is discharged from manifold 52 through plurality of tubes 60 and into a core engine exhaust stream 85. In other embodiments, noise suppression system 50 does not utilize tubes 60, but rather air is discharged into core engine exhaust stream 85 through other means. Accordingly, each tube 60 includes an upstream end 62, a downstream end 64, and a length 66 that is measured between upstream end 62 and downstream end 64, respectively. In the exemplary embodiment, length 66 is sized such that upstream end 62 is coupled to manifold 52 and downstream end 64 is coupled to an end 68 of engine exhaust nozzle 35. In the exemplary embodiment, tubes 60 are arranged in tube pairs 70 wherein each tube pair 70 includes a first tube 72 and a second tube 74. Moreover, in the exemplary embodiment, length 66 enables each tube 60 to extend approximately one-quarter of the way across each respective chevron 44 towards an aft end of each chevron 44.

In the exemplary embodiment, noise suppression system 50 includes eight pairs 70 of tubes 60 arranged azimuthally around an outer periphery of engine exhaust nozzle 35. In an alternative embodiment, noise suppression system 50 includes a plurality of tubes 60 that are not paired. In another alternative embodiment, noise suppression system 50 includes more or less than eight pairs 70 of tubes 60. In the exemplary embodiment, each tube 60 is substantially hollow, has a substantially circular cross-sectional profile, and includes an opening 76 that extends along length 66 of tube 60. Alternatively, tube 60 does not have a circular cross-sectional profile. In the exemplary embodiment, noise suppression system 50 includes four pairs 70 of tubes 60 arranged azimuthally around an outer periphery of core engine exhaust nozzle 35. Tubes 72 and 74 oriented approximately parallel to each other and a centerline axis 82. Furthermore, each tube pair 70 is oriented at an injection angle 80 that is measured with respect to a centerline axis 82. Although noise suppression system 50 is shown as coupled to an outer periphery of core engine exhaust nozzle 35, it should be realized that noise suppression system 50 could also be coupled to an inner periphery of core engine exhaust nozzle 35.

Figure 5:
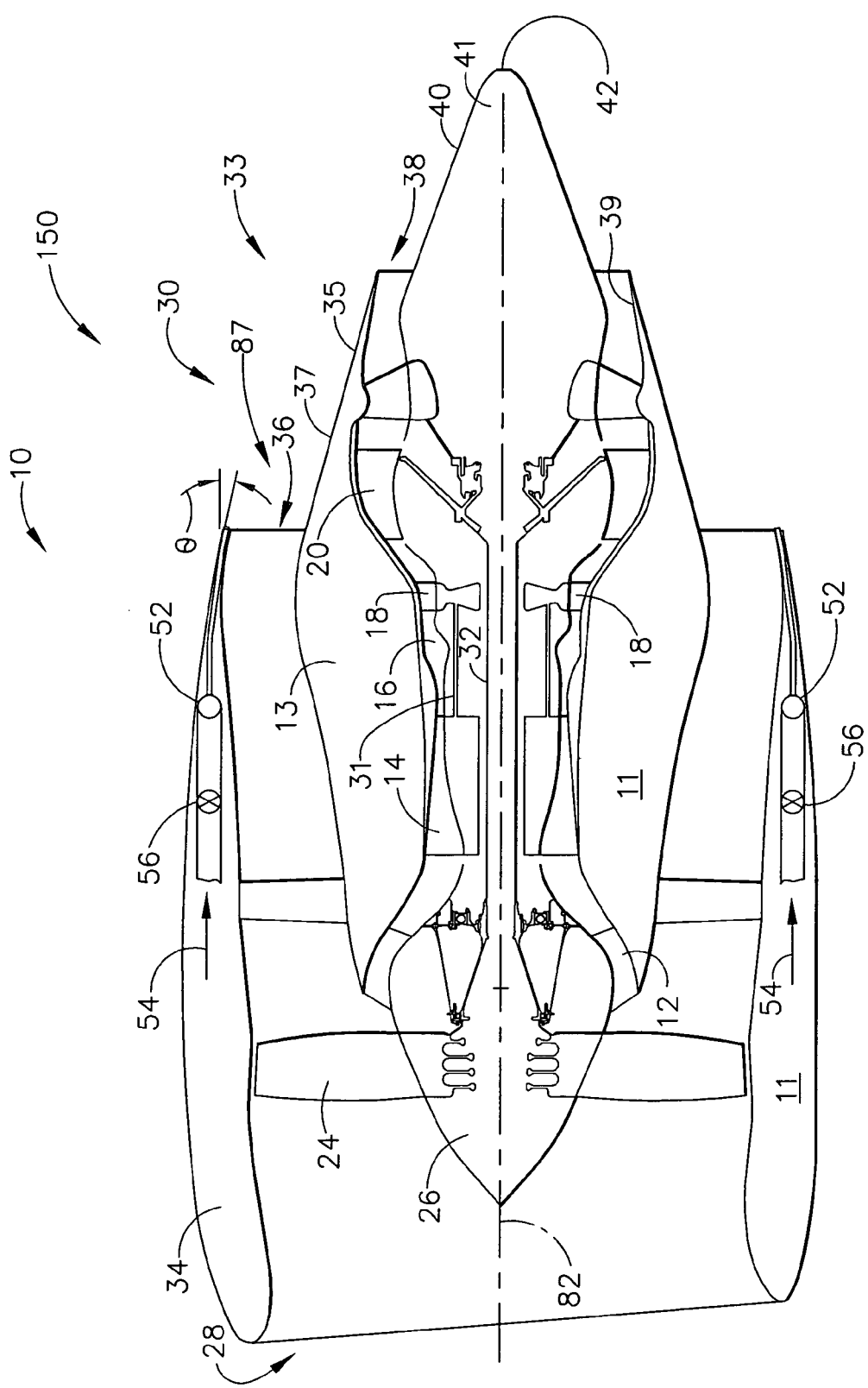
FIG. 5 is a side view of an alternative embodiment of a noise suppression system that may be used with the gas turbine engine shown in FIG. 1.
Figure 6:
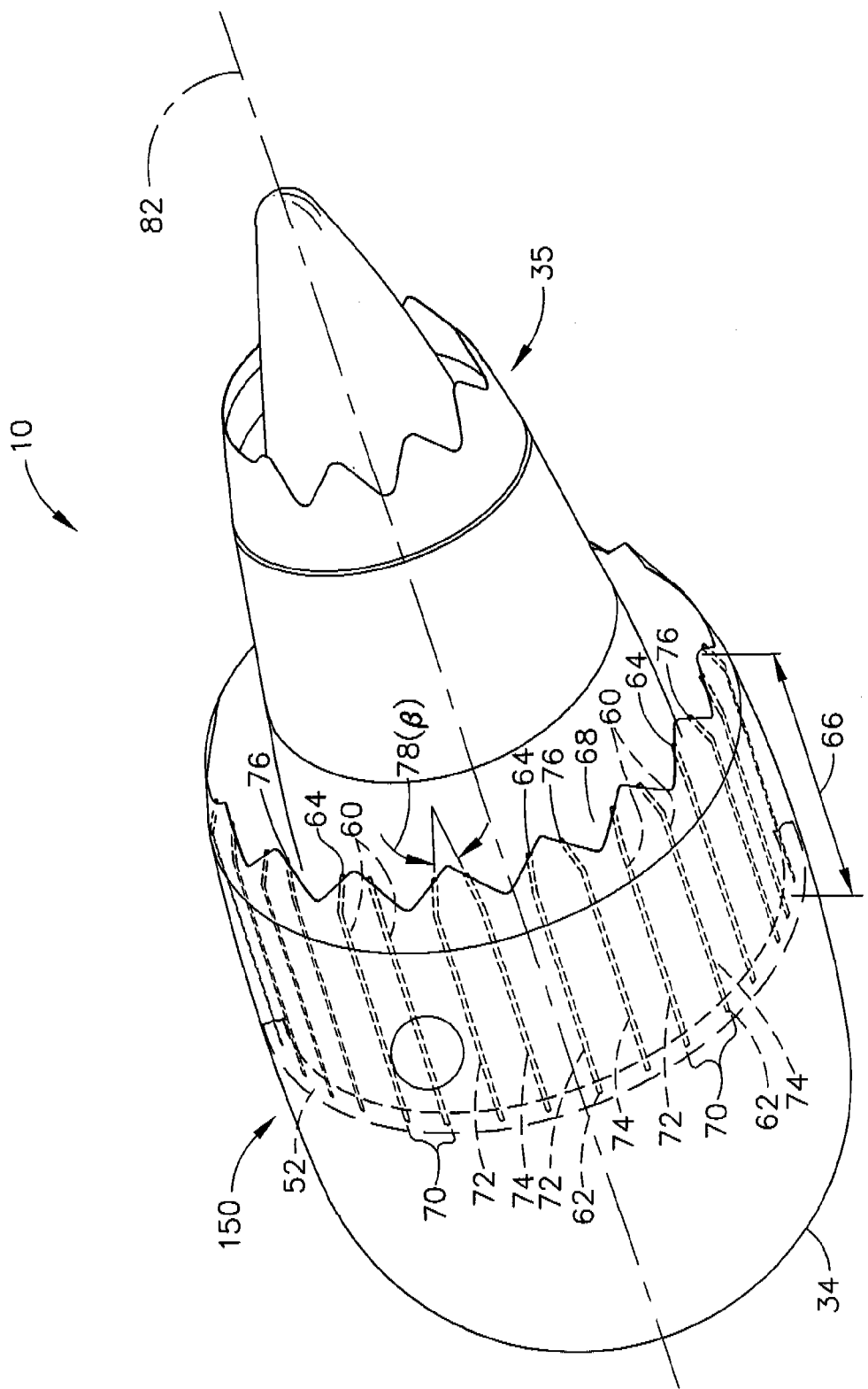
FIG. 6 is a perspective view of the noise suppression system shown in FIG. 5.

FIG. 5 is a side view of an exemplary noise suppression system 150 that can be used with gas turbine engine 10. FIG. 6 is a perspective view of noise suppression system 150. Noise suppression system 150 is substantially similar to noise suppression system 50, (shown in FIGS. 3 and 4) and components of noise suppression system 150 that are identical to components of noise suppression system 50 are identified in FIGS. 5 and 6 using the same reference numerals used in FIGS. 3 and 4.

In an exemplary embodiment, noise suppression system 150 is operably coupled to fan nozzle 34. Noise suppression system 150 includes a manifold 52 coupled to engine exhaust nozzle 35 such that manifold 52 circumscribes engine exhaust nozzle 35. Compressed air is channeled from an air source 54 through an actuation valve 56 into manifold 52. In the exemplary embodiment, air is supplied to manifold 52 from at least one of fan assembly 12, high pressure compressor 14, high pressure turbine 18, or low pressure turbine 20. Alternatively, air may be supplied from any other pressurized air source. In another alternative embodiment, synthetic jets are utilized within noise suppression system 50, and as such, no pressurized air is supplied to noise suppression system 50.

Noise suppression system 150 also includes a plurality of tubes 60 coupled to manifold 52 and operated such that air is discharged from manifold 52 through plurality of tubes 60 and into a core engine exhaust stream 85. Accordingly, each tube 60 includes an upstream end 62, a downstream end 64, and a length 66 that is measured between upstream end 62 and downstream end 64, respectively. In the exemplary embodiment, length 66 is sized such that upstream end 62 is coupled to manifold 52 and downstream end 64 is coupled to an end 68 of engine exhaust nozzle 35. Length 66 is variably selected to facilitate noise suppression system 150 achieving a desired noise suppression level. In the exemplary embodiment, tubes 60 are arranged in tube pairs 70 wherein each tube pair 70 includes a first tube 72 and a second tube 74.

In the exemplary embodiment, noise suppression system 50 includes eight pairs 70 of tubes 60 arranged azimuthally around an outer periphery of engine exhaust nozzle 35. Each tube 60 is substantially hollow and includes an opening 76 that extends along length 66 of tube 60. In one embodiment opening 76 is approximately 0.125 inches in diameter. In another embodiment, opening 76 is approximately 0.0625 inches in diameter. In the exemplary embodiment, noise suppression system 50 includes four pairs 70 of tubes 60 arranged azimuthally around an outer periphery of core engine exhaust nozzle 35. Tubes 72 and 74 oriented approximately parallel to each other and a centerline axis 82. Furthermore, each tube pair 70 is oriented at an injection angle 80 that is measured with respect to a centerline axis 82. Although noise suppression system 150 is shown as coupled to an outer periphery of fan nozzle 34, it should be realized that noise suppression system 150 can also be coupled to an inner periphery of fan nozzle 34.

During operation, tube pairs 70, i.e. "jets" are positioned at a desired injection angle 80 such that air discharged from each tube pair 70 is channeled across chevrons 44 and into each of the trailing vortices that are generated along and downstream each side 100 of each chevron 44. Injection angle 80 is variably selected to facilitate achieving a desired noise suppression level. Channeling air across chevrons 44 facilitates controlling vortex breakdown by energizing the vortex core. More specifically, a small jet of compressed air is injected into the vortex core and interacts with the vortex to facilitate enhancing mixing between the core and fan flow, and between the fan and ambient flows, thus substantially delaying vortex breakdown and energizing vortex to facilitate maintaining the vortex core coherence over a longer distance downstream from the trailing edge, thus reducing the jet noise. Additionally, by preventing vortex breakdown, and by enhancing the mixing, the production of small scale turbulence is substantially prevented and sources of high frequency noise are substantially minimized.

More specifically, each noise suppression system 50 or 150 can be operated in either an activated mode or a de-activated mode. When noise suppression system 50 or 150 are operated in the activated mode, air is supplied into manifold 52 and distributed substantially uniformly among the plurality of pairs of tubes 70. Since each pair of tubes 70 includes a first tube 72 and a second tube 74 that are offset from nozzle design 11 by a predefined angle 80, the air discharged from each pair of tubes 70 is channeled across plurality of chevrons 42 into each of the trailing vortices that are generated downstream from each chevron 44. When noise suppression system is deactivated, no air is channeled through pairs of tubes 70.

In an alternative embodiment, the "jets" are generated by any other means that substantially mimics the function of the tubes 60, such as, but not limited to, positioning a plurality of shaped holes, i.e., scoops, upstream from the plurality of chevrons 44 to channel a small quantity of core flow into the fan stream side, or from the fan flow into the free stream side by account of the pressure differences that exist between each one of the two streams.

The above-described noise suppression system includes a manifold and plurality of pairs of hollow injection tubes, i.e. "jets", coupled to the manifold, wherein each pair of tubes discharges air across a plurality of chevrons 44 coupled to either the core engine nozzle or the fan nozzle. More specifically, the above-described noise suppression system includes a manifold and plurality of pairs of hollow tubes that are oriented at a complex angle, i.e. angle 80, wherein each tube has a predetermined opening such that the air discharged across the plurality of chevrons 44, has an injection velocity, a relative velocity and a mass-flow-rate that are variably selected to simulate a mechanical chevron. The injection tubes are positioned azimuthally around either the core engine nozzle or the fan nozzle to facilitate increasing the effectiveness of the chevron mixing effect within the engine shear layer and delaying formation of small scale turbulence.

The "jets" flow can be controlled to maximize the effect during take-off and landing and be activated when desired to facilitate eliminating a performance penalty associated with chevrons during most of the flight duration, and/or to facilitate suppressing an infra-red signature generated by engine 10. Noise suppression system can be operated either continuously or by pulsating control valve 56. Operating the noise suppression system by pulsating valve 56 facilitates increasing effective amount of secondary airflow injected across the plurality of chevrons. Accordingly, the noise suppression system described herein facilitates reducing noise during takeoff or landing, and reducing or eliminating engine performance losses during cruise conditions.

Accordingly, the noise suppression system facilitates enhancing mixing between the core engine flow and fan flow, and between the fan and ambient flows and thereby facilitates reducing jet noise without increasing high frequency noise. The noise suppression system described herein also facilitates reducing the thrust penalty caused by the chevrons by minimizing the losses incurred due to the vortex breakdown instability process.

In an alternative embodiment, noise suppression systems 50 or 150 can be configured with a plurality of parallel tube pairs wherein the system includes a plurality of tubes having a first length and a plurality of tubes having a second length that is longer than the first length. In another exemplary embodiment, noise suppression system 50 or 150 includes a plurality of additional tubes having at least a third length that is different than that of the first and/or second tube lengths.

Exemplary embodiments of noise suppression systems and exhaust assemblies are described above in detail. The noise suppression systems are not limited to the specific embodiments described herein, but rather, components of each assembly may be utilized independently and separately from other components described herein. For example, each noise suppression component can also be used in combination with other exhaust assemblies and/or other noise suppression systems.

While the invention has been described in terms of various specific embodiments, those skilled in the art will recognize that the invention can be practiced with modification within the spirit and scope of the claims.

What is claimed is:

1. A method for operating a gas turbine engine, said gas turbine engine comprising a nozzle including a plurality of chevrons coupled to the nozzle, said method comprising:
   positioning a plurality of tubes azimuthally around an outer periphery of the nozzle;
   coupling an upstream end of each of the plurality of tubes to a manifold;
   coupling a downstream end of each of the plurality of tubes to the nozzle such that the plurality of tubes each externally extend away from the manifold,
   channeling compressed air from the gas turbine engine to a noise suppression system that includes the manifold and the plurality of tubes; and
   selectively operating the noise suppression system such that air discharged from the plurality of tubes of the noise suppression system enhances a streamwise vortex generated downstream from each respective chevron.

2. A method in accordance with claim 1 wherein selectively operating the noise suppression system further comprises selectively operating the noise suppression system such that air discharged from the noise suppression system facilitates reducing gas turbine noise generated during engine operation.

3. A method in accordance with claim 1 wherein channeling compressed air from the gas turbine engine to a noise suppression system further comprises:
   channeling compressed air from the gas turbine engine into the manifold; and
   discharging the air from the manifold into the respective chevron flowpath through the plurality of tubes.

4. A method in accordance with claim 3 wherein the noise suppression system includes an actuation valve, wherein channeling compressed air from the gas turbine engine to a noise suppression system further comprises selectively operating the actuation valve to channel compressed air from the gas turbine engine to the manifold.

5. A method in accordance with claim 3 the plurality of tubes includes at least a first tube and a second tube, wherein discharging air from the manifold further comprises orienting the first tube and the second tube such that air discharged from the first tube and the second tube generate a single vortex on both sides of each respective chevron.

6. A method in accordance with claim 3 wherein said discharging air from the manifold further comprises discharging compressed air from the manifold through the plurality of tubes into a core gas turbine engine nozzle chevron flowpath.

7. A method in accordance with claim 1 wherein said discharging air from the manifold further comprises discharging compressed air from the manifold through the plurality of tubes into a fan nozzle chevron flowpath.

8. An assembly for a gas turbine engine, said assembly comprising:
 a gas turbine nozzle;
 a plurality of chevrons coupled to said gas turbine nozzle; and
 a noise suppression system coupled to said gas turbine nozzle, said noise suppression system comprising a manifold coupled to said gas turbine nozzle and a plurality of azimuthally arranged tubes each comprising an upstream end coupled to said manifold and a downstream end coupled to said gas turbine nozzle such that said plurality of tubes each extend away from said manifold, said noise suppression system is selectively operable to discharge flow from said plurality of tubes to enhance a streamwise vortex generated downstream from each respective chevron.

9. An assembly in accordance with claim 8 wherein each of said plurality of tubes is selectively oriented to facilitate enhancing a vortex generated in said gas turbine nozzle chevron flowpath.

10. An assembly in accordance with claim 9 wherein said plurality of tubes comprises a plurality of tube pairs comprising:
 a first tube that extends radially inward at an angle β with respect to a centerline axis; and
 a second tube that extends radially inward at the angle β with respect to the centerline axis, said first tube oriented approximately parallel to said second tube.

11. An assembly in accordance with claim 10 wherein each of said plurality of tube pairs is selectively oriented to facilitate generating a streamwise vortex downstream from each respective chevron in a core gas turbine engine nozzle flowpath.

12. An assembly in accordance with claim 10 wherein each of said plurality of tube pairs is selectively oriented to facilitate generating a streamwise vortex downstream from each respective chevron in a fan nozzle flowpath.

13. An assembly in accordance with claim 8 wherein said noise suppression system further comprises exactly eight tube pairs coupled to said manifold, each said tube pair being selectively oriented to facilitate generating a streamwise vortex downstream from each respective chevron.

14. An assembly in accordance with claim 8 wherein said noise suppression system further comprises an actuation valve selectively operable to discharge compressed air from said gas turbine engine to said noise suppression system, such that said noise suppression system is at least one of continuously operated or pulse operated.

15. A gas turbine engine comprising:
 a core engine nozzle;
 a fan nozzle;
 a plurality of chevrons coupled to at least one of said core engine nozzle and said fan nozzle; and
 a noise suppression system coupled to at least one of said core engine nozzle and said fan nozzle, said noise suppression system comprising a manifold coupled to at least one of said core engine nozzle and said fan nozzle and a plurality of tubes each comprising an upstream end coupled to said manifold and a downstream end coupled to said at least one of said core engine nozzle and said fan nozzle so that said plurality of tubes externally extend away from said manifold, said noise suppression system is selectively operable to discharge flow from said plurality of tubes to enhance a streamwise vortex generated downstream from each respective chevron.

16. A gas turbine in accordance with claim 15 wherein a plurality of tube pairs are coupled to said manifold, each said tube pair is selectively oriented to facilitate enhancing a vortex generated downstream from each respective chevron.

17. A gas turbine in accordance wit claim 16 wherein each said tube pair composes:
 a first tube that extends radially inward at an angle β with respect to a centerline axis; and
 a second tube that extends radially inward at the angle β with respect to the centerline axis, said first tube oriented approximately parallel to said second tube.

18. A gas turbine in accordance with claim 16 wherein each said tube pair is selectively oriented to facilitate enhancing a vortex generated downstream from at least one of said core gas turbine engine nozzle chevron and said fan nozzle chevron.

19. A gas turbine in accordance with claim 16 wherein said noise suppression system further comprises exactly eight tube pairs coupled to said manifold, each said tube pair is selectively oriented to facilitate generating a vortex downstream from each respective chevron.

20. A gas turbine in accordance with claim 15 wherein said noise suppression system further comprises an actuation valve selectively operable to discharge air from said gas turbine engine into said noise suppression system.

* * * * *

UNITED STATES PATENT AND TRADEMARK OFFICE
CERTIFICATE OF CORRECTION

PATENT NO.        : 7,246,481 B2                              Page 1 of 1
APPLICATION NO.   : 10/810142
DATED             : July 24, 2007
INVENTOR(S)       : Gutmark et al.

It is certified that error appears in the above-identified patent and that said Letters Patent is hereby corrected as shown below:

Column 8, line 32, delete "wit claim" and insert therefor -- with claim --.
Column 8, line 33, delete "pair composes:" and insert therefor -- pair comprises: --.

Signed and Sealed this

Twenty-seventh Day of November, 2007

JON W. DUDAS
*Director of the United States Patent and Trademark Office*